(12) United States Patent
Hellsten et al.

(10) Patent No.: US 7,626,310 B2
(45) Date of Patent: Dec. 1, 2009

(54) ROTOR OF AN ELECTRICAL MACHINE

(75) Inventors: Juha Hellsten, Espoo (FI); Jarkko Saramo, Espoo (FI); Yrjö Tyllinen, Tervakoski (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/514,265

(22) Filed: Sep. 1, 2006

(65) Prior Publication Data

US 2007/0052321 A1    Mar. 8, 2007

(30) Foreign Application Priority Data

Sep. 5, 2005    (FI) .................................. 20050875

(51) Int. Cl.
    *H02K 3/48* (2006.01)
(52) U.S. Cl. ...................... 310/271; 310/270
(58) Field of Classification Search ................ 310/214, 310/270, 271
    See application file for complete search history.

(56) References Cited

U.S. PATENT DOCUMENTS

| | | | |
|---|---|---|---|
| 1,870,056 A | 8/1932 | Kropff | |
| 3,047,756 A | 7/1962 | Coggeshall | |
| 3,048,725 A | 8/1962 | Wesolowski | |
| 3,065,367 A | 11/1962 | Costello et al. | |
| 3,179,828 A * | 4/1965 | Apking et al. | 310/183 |
| 3,324,324 A | 6/1967 | Richardson et al. | |
| 3,634,709 A | 1/1972 | Le Henaff | |
| 4,091,301 A | 5/1978 | Blank | |
| 5,352,948 A | 10/1994 | Kirn et al. | |
| 6,029,338 A | 2/2000 | Heil et al. | |
| 6,124,661 A | 9/2000 | Gardner | |
| 6,366,001 B1 | 4/2002 | Gunnarsson et al. | |
| 6,864,617 B1 * | 3/2005 | Wang et al. | 310/270 |
| 2002/0079776 A1 | 6/2002 | Niimi et al. | |
| 2005/0023928 A1 | 2/2005 | Doherty et al. | |

FOREIGN PATENT DOCUMENTS

| | | |
|---|---|---|
| DE | 44 04 754 C1 | 3/1995 |
| GB | 190521 A | 12/1922 |
| GB | 1549202 A | 8/1979 |
| JP | 02 065641 A | 3/1990 |
| JP | 2-155445 A | 6/1990 |

OTHER PUBLICATIONS

National Board of Patents and Registration of Finland Search Report, Nov. 2005.
Finnish Search Report, dated Apr. 3, 2007, cited in co-pending Finnish Patent Application No. 200550875.
Communication from the European Patent Office, dated Dec. 18, 2006, cited in co-pending Application No. 06017855.5—2207.

* cited by examiner

*Primary Examiner*—Nguyen N Hanh
(74) *Attorney, Agent, or Firm*—Buchanan Ingersoll & Rooney PC

(57) ABSTRACT

An arrangement in a rotor of an electrical machine; the rotor (5) rotates around its axis of rotation and comprises of, at least, the frame (13) and coils (15), which are projected as coil ends (11). There are protruding beams (17,18) substantially projecting in the direction of the longitudinal axis from the frame (13) outside the outer ring surface (12) formed by the coil ends (11); a binding band (9) is fitted on the protruding beams (17, 18) and a binding band (9) is glideable on the protruding beams (17, 18).

10 Claims, 4 Drawing Sheets

ROTOR OF AN ELECTRICAL MACHINE

BACKGROUND

The object of the invention is an arrangement in a rotor of an electrical machine and a method in the manufacture of the rotor of an electrical machine.

In electrical machines, the windings are usually placed in the slots located in the inner surface of the stator and the outer surface of the rotor. The slot winding is made of coils that are placed in the slots of the stator or the rotor. The coil consists of many conducting wire layers. The coil sides are connected together by the coil ends located at the ends of the slots.

The coil ends of the electrical machine rotors require a reinforcing structure against radial forces created when the rotor rotates. The reinforcement is usually made by winding fiberglass, Kevlar or carbon fiber tape or steel wire to the coil ends. When winding, the rotor is rotated around its axis of rotation and fiber is wound around the coil ends from the feed coil through the heating stage and guide roller. A support cylinder is installed inside the coil ends in order to create pre-tension in the wound reinforcement binding. An edge tape is installed before winding so that the wound tape will not spread. The edge tape is often made by resinifying a hard ring of fiberglass. Reinforcement by winding is presented in U.S. Pat. No. 6,029,338.

Reinforcement by winding is time-consuming. Manufacturing time is also spent on the furnacing, heating or tin coating in the reinforcement process. Because of the complexity, reinforcement by winding is also sensitive to variations in quality.

The durability of the reinforcement of the rotor coil ends is really tested in situations in which the rotation speeds, mass of the coil end of the rotor or diameter are big. For instance, the required rotation speed range considering wind power generators is large. Wind speed may quickly rise in gusts of wind, in which case the force directed to the binding trebles quickly. When the load leaves the network, the rotation speed of the rotor may quickly rise to 75-100% of the nominal speed.

The durability of large speeds is not good in reinforcements by winding. The winding material properties are one reason for this.

SUMMARY

The purpose of the present invention is to create an arrangement and a method for reinforcing the coil ends of a rotor of an electrical machine.

In the invented arrangement an electrical machine rotor rotates round its axis of rotation and comprises of at least a frame and coils, which are projected as coil ends. Protruding beams are projecting substantially in the direction of the longitudinal axis from the frame outside the outer ring surface formed by the coil ends. A binding band is fitted on the protruding beams and a binding band is glideable on the protruding beams.

In the invented method in the manufacture of a rotor of an electrical machine coils projecting as coil ends are installed in the frame of the rotor. Protruding beams projecting substantially in the direction of the longitudinal axis from the frame are installed outside the outer ring surface formed by the coil ends. A binding band is fitted on the protruding beams by gliding the rotor inside the binding band.

According to the preferred embodiment, the protruding beams are long slot wedges. The slot wedges are projected from the frame, at least along the insulated part of the coil ends, so that the insulations are not damaged during the installation and the binding stays in place. The slot wedges almost reach the coil ends in the preferred solution. The slot wedges function as sliding surfaces and protect the coil end insulations during the installation of the binding. The slot wedges can be made of fiberglass, for instance, which has the necessary durability, sufficient sliding surface qualities and required temperature resistance. The slot wedges can also function as an insulation element if the binding is made of conducting material.

The binding band carries radial forces, e.g. centrifugal forces, created when the rotor rotates through the protruding beams.

According to the preferred embodiment, the binding band is self-fastening, i.e. the binding does not have to be separately locked in place although the structure does not exclude the use of axial locking.

According to the preferred embodiment, the binding band is conical on the interior surface so that it tightens during the installation. According to the preferred embodiment, the binding is measured so that it creates a controlled transformation in the copper bars of the coil ends. At the same time, a radial force is directed to the binding band from the copper bars. In other words, the copper bars pre-tighten the binding band. In that case, the inner diameter of the binding band at the wider part of the cone is equal to the original outer ring surface diameter of the slot wedges. At the narrow part of the cone, the inner diameter of the binding is smaller than the outer ring surface diameter of the slot wedges. The most tension is at the end of the binding band, in which the narrowest part of the cone is located. The biggest thickness of the binding band is at the narrowest part and the binding band is thus the strongest at the most important end, i.e. at the outermost point of the coil ends. The preferred conical ratio of the binding is 1:40 ... 1:50.

The binding band may also be partially conical so that a straight part is at the wider part of the cone.

An embodiment in accordance with the invention can significantly reduce quality risks regarding the reinforcement of the coil ends. A binding band made of metallic or carbon fiber, for instance, is separately prefabricated. The binding band manufactured with precision according to dimensions enables quality control for durability-critical bindings in a better fashion than solutions made by winding to the coil ends. The binding band can be examined in different ways prior to the installation with ultrasound, for instance.

The invented solution allows the binding band to be made of several materials depending on the application.

A preferred embodiment of the invention is the rotor of a wind power generator. Strain is directed to the rotor in a runaway situation, and a solution in accordance with the invention significantly reduces the damage risks focused on the rotor in a situation of excessive speed.

The invention makes the manufacture of the rotor faster. Resin applying is not required during the installation, and the binding band does not need separate furnacing or heating after the installation. The installation can be performed at normal factory temperature in the production facilities. The binding band can be installed by lifting the rotor at the end of the shaft with a crane and gliding the rotor inside the binding band utilizing the rotor's mass. The protruding beams, for instance slot wedges, function as sliding surfaces and protect the coil end insulations during the installation of the binding band allowing a smooth continuous movement. The rotor is lowered inside the binding band with a crane until the binding band carries the rotor's mass. In this type of installation, the binding band should reach the end of the coil ends or even go a little further so that the coil ends will not be damaged. A binding band, which has a conical inner surface, tightens during the installation.

The invention also makes the cooling of the coil ends more effective, which is particularly important for high-power machines. The binding band is supported to the protruding beams and does not directly rest on the coil ends. Cooling air can flow under the binding band through the air channel formed by two slot wedges, the binding and the coil ends. When the binding band rotates, the slot wedges function as wings making the air movement more efficient. The binding band does not have to be solid; it can be like a net with several air holes.

BRIEF DESCRIPTION OF THE DRAWINGS

In the following the invention will be described in more detail with the help of certain embodiments by referring to the enclosed drawings, where.

DETAILED DESCRIPTION

Figure 1:
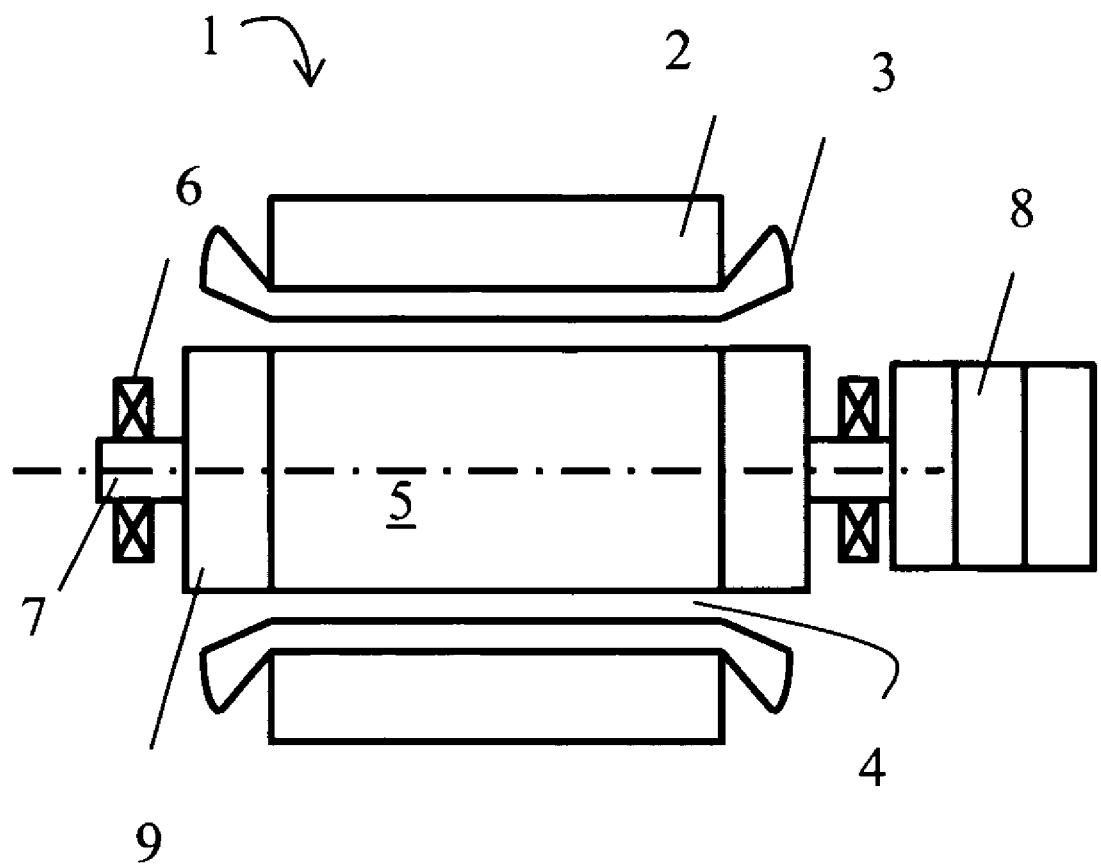
FIG. 1 illustrates the slip-ring generator with binding bands.

FIG. 1 presents an arrangement to reinforce the coil ends of a rotor of electrical machines. The electrical machine is only illustrated schematically without any details. The electrical machine is a slip-ring generator in the first embodiment of the invention. The slip-ring generator 1 includes the stator 2, and the windings 3 are placed inside the stator's inner ring. The rotor 5 is installed at a distance of the air gap 4 inside the stator. The rotor 5 rotates on the shaft 7 supported to the bearings 6. The slip-ring unit 8 is placed in a separate case. The binding bands 9, with which the coil ends are reinforced, are located at the ends of the rotor 5.

Figure 2:
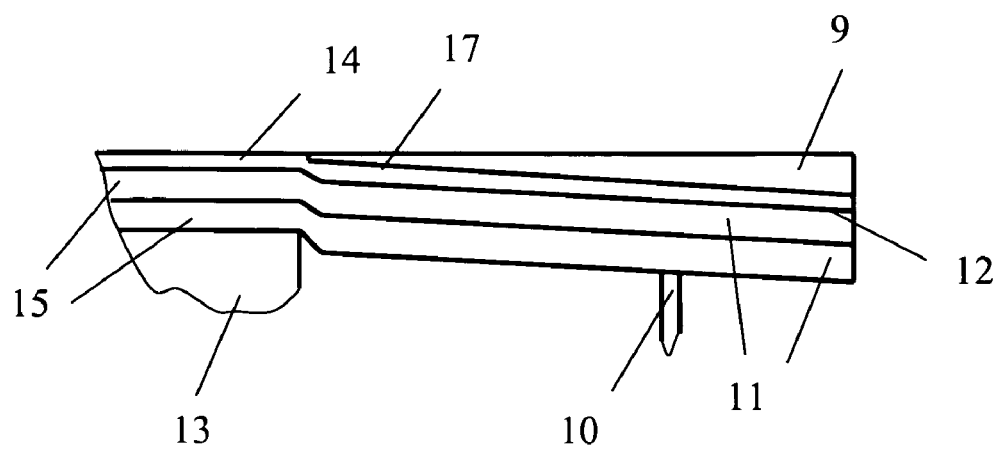
FIG. 2 presents a partial image of the rotor end illustrated from the side.

FIG. 2 presents a partial image of the rotor end illustrated from the side. The coils 15 are projected from the frame 13 as coil ends 11. Outside the outer ring surface 12 formed by the coil ends 11 is the protruding beam, the additional length 17 of the slot wedge 14, continuing in the direction of the longitudinal axis from the frame 13. The conical binding band 9 is fitted on the slot wedge 17. The edge of the binding band 9 carries and supports the frame 13 of the rotor. The binding band 9 is measured so that it presses the slot wedges 17 and coil ends 11 so that they slightly bend inwards towards the shaft 7. The centralization is made from the inside of the coil ends 11 with the centralization ring 10. The centralization ring 10 centralizes the coil ends 11 with the shaft 7.

Figure 3:
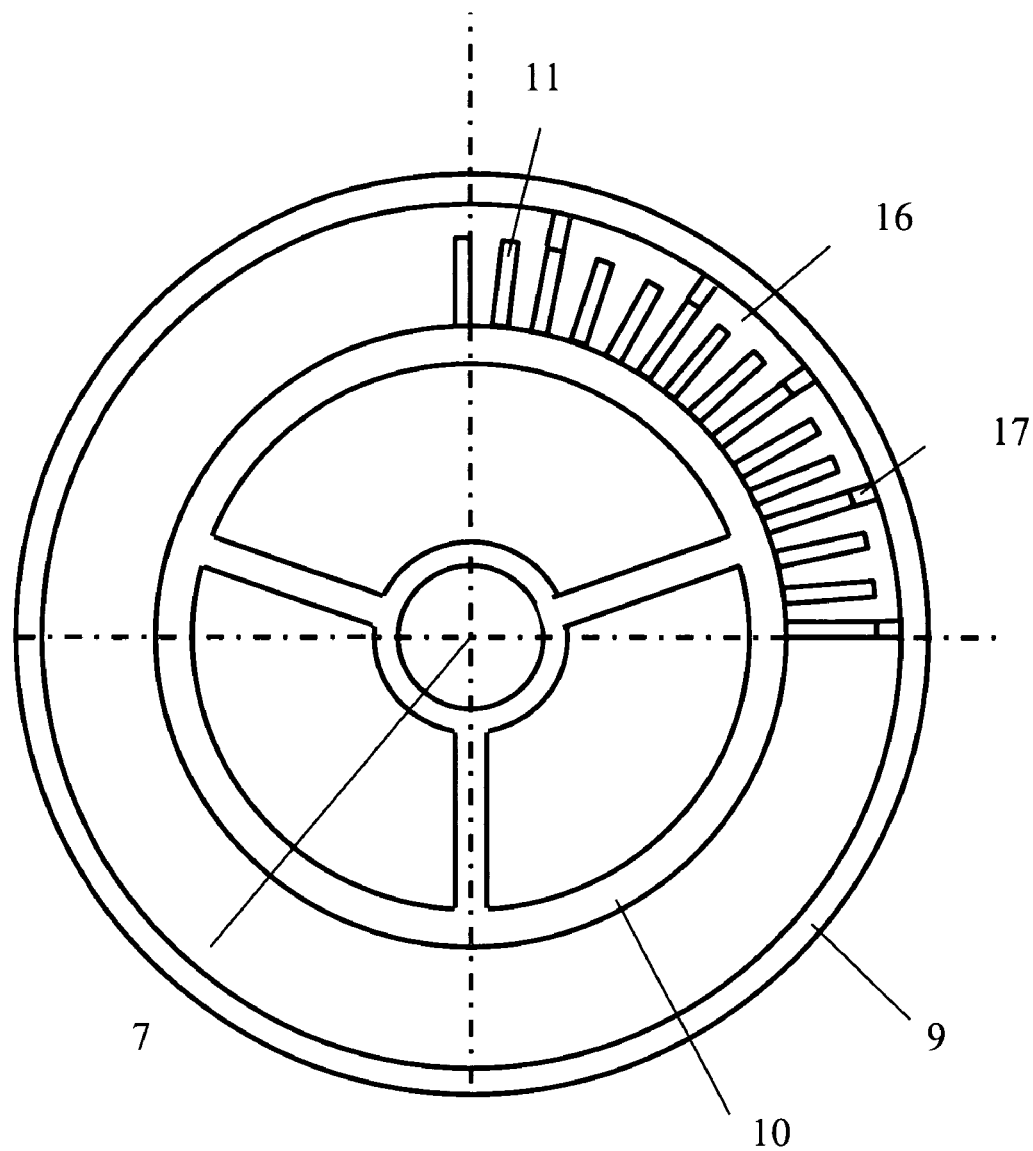
FIG. 3 illustrates an axial cross section from the rotor end.

FIG. 3 illustrates an axial cross section from the rotor end. The solid binding band 9 is supported by the additional length of slot wedges 17. The gap between two slot wedges 17, the binding band 9 and the coil ends 11 form an air channel 16, in which cooling air can flow under the binding band 9. The centralization ring 10 is supported by the shaft 7. Only one sector of coil ends and slot wedges is drawn in the figure, but they actually encircle round the entire ring.

Figure 4:
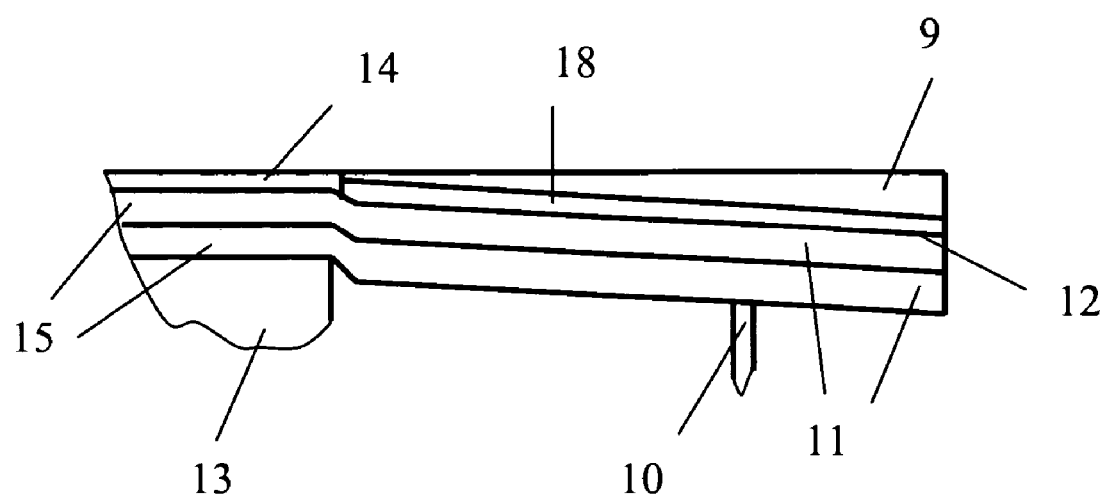
FIG. 4 presents a partial image of the rotor end illustrated from the side.

FIG. 4 presents a partial image of the rotor end illustrated from the side. The coils 15 are projected from the frame 13 as coil ends 11. Outside the outer ring surface 12 formed by the coil ends 11 is the protruding beam, a support part 18, installed in the direction of the longitudinal axis from the frame 13. The conical binding band 9 is fitted on the support part 18. The support parts 18 function as sliding surfaces and protect the coil end insulations during the installation of the binding band 9. The edge of the binding band 9 carries and supports the frame 13 of the rotor. The binding band 9 is measured so that it presses the support parts 18 and coil ends 11 so that they slightly bend inwards towards the shaft 7. The centralization is made from the inside of the coil ends 11 with the centralization ring 10. The centralization ring 10 centralizes the coil ends 11 with the shaft 7.

Although a machine operating as a generator is described above, the invention operates similarly with engines. The invention also functions in different electrical machine types and rotor solutions, such as direct-current machines and coil-winding rotors.

In the above, the invention has been described with the help of certain embodiments. However, the description should not be considered as limiting the scope of patent protection; the embodiments of the invention may vary within the scope of the following claims.

Part list: 1 slip-ring engine; 2 stator; 3 windings; 4 air gap; 5 rotor; 6 bearing; 7 shaft; 8 slip-ring unit; 9 binding band; 10 centralization ring; 11 coil end; 12 outer ring surface; 13 frame; 14 slot wedge; 15 coils; 16 air channel; 17 slot wedge, 18 support part.

The invention claimed is:

1. An arrangement in an electrical machine rotor, which rotates around an axis of rotation and comprises at least a frame and coils, which are projected as coil ends, wherein:
    protruding beams project substantially in the direction of the longitudinal axis from the frame and outside an outer ring surface formed by ends of the coils; and
    an annular binding band is fitted on the protruding beams, said binding band having an inner surface adapted to glide on the protruding beams during the installation of the binding band,
    wherein the binding band is tension fit on the protruding beams.

2. An arrangement according to claim 1, wherein the protruding beams are slot wedges.

3. An arrangement according to claim 1, wherein the binding band is at least partially conical on the inner surface.

4. An arrangement according to claim 3, wherein the conical ratio of the binding band is 1:40 . . . 1:50.

5. An arrangement according to claim 1, wherein the binding band is self-fastening.

6. An arrangement according to claim 1, wherein the electrical machine is a slip-ring generator.

7. An arrangement according to claim 2, wherein an air channel is formed by the gap between two slot wedges, the binding band and the coil ends.

8. A method of manufacturing a rotor of an electrical machine, the method comprising:
    installing coils projecting as coil ends in a frame of the rotor;
    installing protruding beams projecting substantially in the direction of the longitudinal axis from the frame outside the outer ring surface formed by the coil ends; and
    fitting an annular binding band on the protruding beams by gliding the protruding beams inside the binding band, wherein the binding band is tension fit on the protruding beams.

9. The arrangement according to claim 1, wherein the binding band includes a plurality of holes having axes perpendicular to the axis of rotation.

10. The method of claim 8, wherein the binding band includes a plurality of holes having axes perpendicular to the axis of rotation.

* * * * *